J. F. Harcourt.

Wheat Drill.

No. 59,595.  Patented Nov. 13, 1866.

Witnesses:  Inventor:

UNITED STATES PATENT OFFICE.

J. F. HARCOURT, OF MOSCOW, INDIANA.

IMPROVEMENT IN WHEAT-DRILLS.

Specification forming part of Letters Patent No. 59,595, dated November 13, 1866.

*To all whom it may concern:*

Be it known that I, JAMES F. HARCOURT, of Moscow, Rush county, and State of Indiana, have invented a new and Improved Wheat-Drill; and I do hereby declare that the following is a full, clear, and exact description thereof, which will enable others skilled in the art to make and use the same, reference being had to the accompanying drawings, forming part of this specification, in which—

Figure 1:
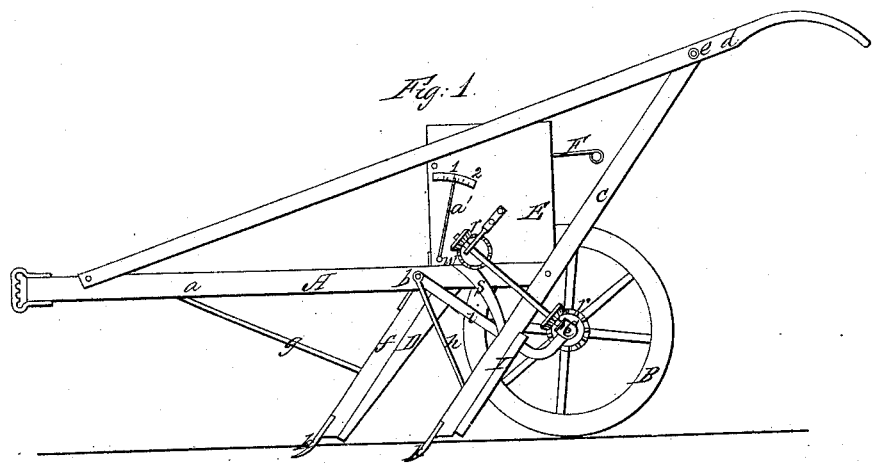
Figure 2:
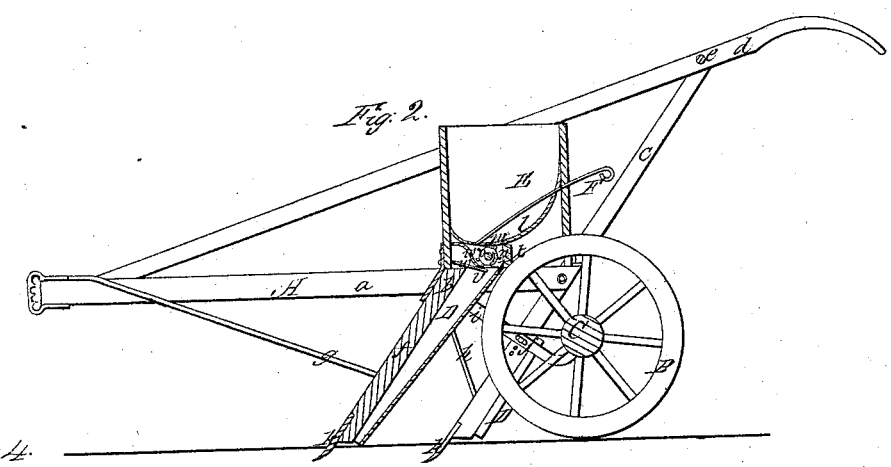
Figure 4:
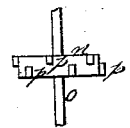
Figure 3:
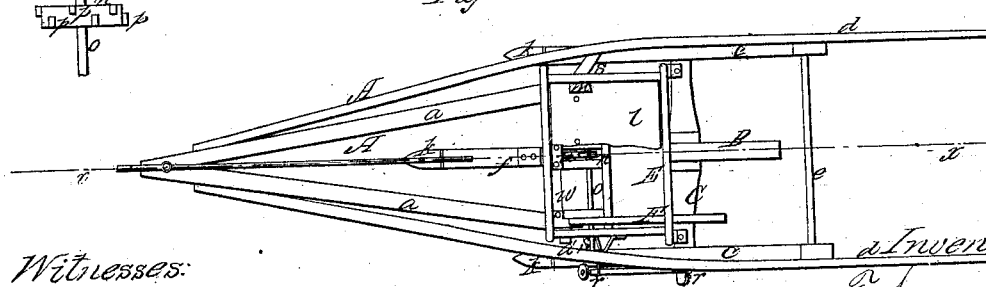

Figure 1 is a side view of my invention; Fig. 2, a side sectional view of the same, taken in the line $x\ x$, Fig. 3; Fig. 3, a plan or top view of the same; Fig. 4, a detached view of a seed-distributing wheel pertaining to the same.

Similar letters of reference indicate like parts.

This invention relates to a new and improved device for sowing wheat and other grain in drills; and it consists in a novel construction and arrangement of parts, as hereinafter fully shown and described, whereby a very simple and efficient implement for the purpose is obtained—one that may be turned within a limited compass, and which will admit of having the seed planted at a greater or less depth, as may be desired.

A represents the frame of the machine, composed of two bars, $a\ a$, arranged in V form and connected by a cross-bar, $b$. The rear ends of the bars $a\ a$ are attached to standards $c\ c$, slightly inclined, and the front parts of the bars $a\ a$ having the lower ends of handles $d\ d$ bolted to them, the rear parts of said handles being connected by a screw-rod, $e$, with the upper ends of the standards $c\ c$.

A standard, $f$, is fitted on the cross-bar $b$ of the frame A, and is braced by a rod, $g$, the lower ends of the standards $c\ c$ being braced by rods $h$. The standard $f$ is in front of the standards $c\ c$, and in line with the center of the space between said standards.

B represents a wheel, the shaft C of which has its bearings in the rear parts of arms $i\ i$, the front ends of which are fitted on the ends of the cross-bar $b$, or in bolts passing into the ends of the same. The shaft C is at the rear of the standards $c\ c$, and said shaft and wheel may be adjusted higher or lower by adjusting the rear parts of the arms $i\ i$ higher or lower, pins $j$ passing through oblong slots in the arms into any one of a series of holes in the standards $c\ c$.

The standards $c\ c\ f$ have each a seed-conveying tube, D, attached to their rear sides, through which the seed discharged from the hopper E drops into the furrows, the latter being made by shares $k$, attached to the lower ends of the standards, and it will be seen that the depth of the furrows may be regulated by adjusting the wheel B higher or lower.

The hopper E is fitted on the rear end of the frame A, and is provided with a concave bottom, $l$, having three openings, $m$, made in it, said openings being directly over wheels $n$ on a shaft, $o$, underneath the bottom $l$. The wheels $n$ are provided at their peripheries with teeth $p$, (see Figs. 2 and 4,) and these wheels discharge the seed from the hopper, the shaft $o$ being rotated by gears $r$ from the shaft C, as shown clearly in Fig. 1. The central wheel $n$ discharges the seed directly into the tube D of the front standard, $f$; but the other two wheels discharge the seed into tubes $s$, which lead into the tubes D of the standards $c\ c$.

The wheels $n$ work or rotate within small boxes or inclosures $t$, each of which is provided with an elastic or yielding plate, $u$, at its bottom, by raising or lowering which the discharge of the seed may be graduated as desired, said plates being adjusted by arms $v$, which project from a shaft, $w$, the latter being turned through the medium of an index-arm, $a'$, at the outer side of the hopper. (See Fig. 3.)

If necessary or desired, cut-offs F may be fitted within the hopper, so that the seed may be discharged from two or one only of the holes or openings $m$ whenever required.

Having thus described my invention, I claim as new and desire to secure by Letters Patent—

1. The concave bottom $l$ in hopper E, provided with the holes or openings $m$, in combination with the toothed wheels $n$, fitted in inclosures $t$ underneath the bottom $l$, the yielding plates $u$, and arms $v$, attached to shaft $w$, for adjusting the plates $u$, substantially as and for the purpose set forth.

2. The pivoted standard $c$, in combination with the slotted arm $i$, bearing the shaft C, substantially as described, for the purpose specified.

3. The adjustable yielding plate $u$, in combination with arms $v$, shaft $w$, and index-arm $a'$, substantially as described, for the purpose specified.

JAMES. F. HARCOURT.

Witnesses:
JAMES R. MORGAN,
ISRAEL BUELL.